July 10, 1928.                                                    1,676,708
                      G. J. POIVILLIERS
    APPARATUS FOR AUTOMATICALLY DRAWING MAPS AND PLANS FROM
              TWO TERRESTIAL OR AERIAL PHOTOGRAPHS
                    Filed April 16, 1923      6 Sheets-Sheet 1
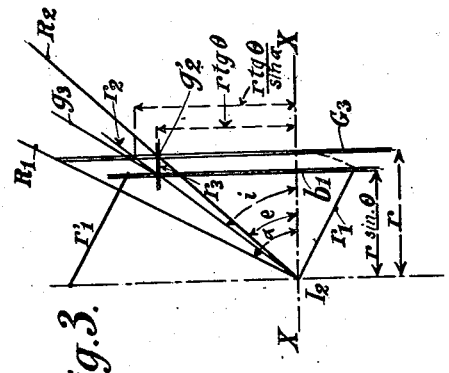
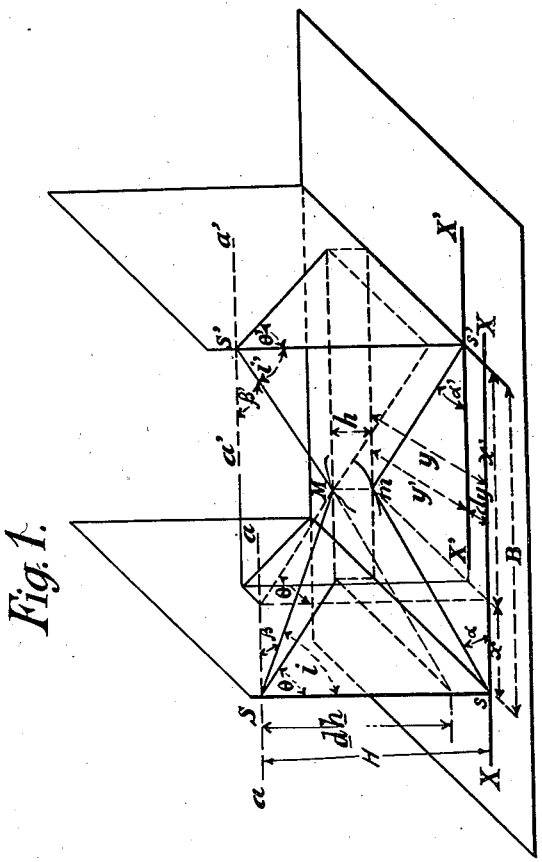

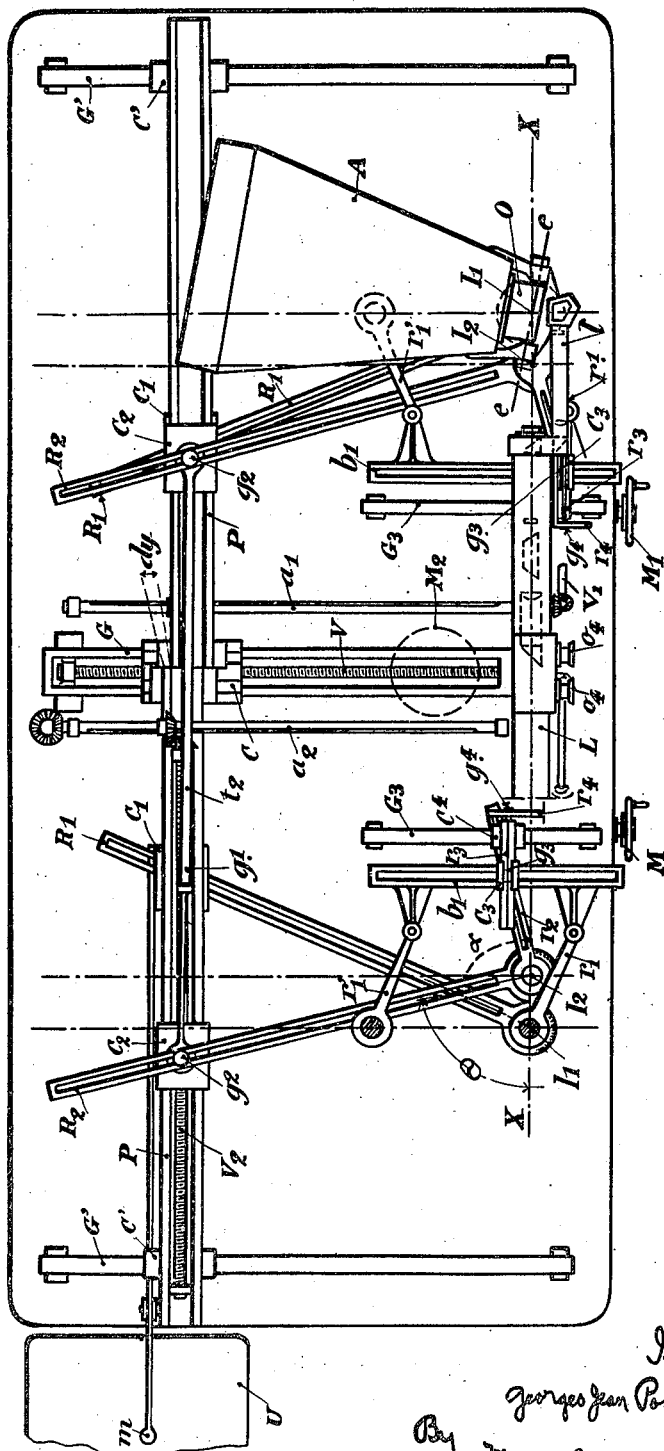

July 10, 1928.

G. J. POIVILLIERS 1,676,708

APPARATUS FOR AUTOMATICALLY DRAWING MAPS AND PLANS FROM
TWO TERRESTIAL OR AERIAL PHOTOGRAPHS

Filed April 16, 1923    6 Sheets-Sheet 3

July 10, 1928.  
G. J. POIVILLIERS  
APPARATUS FOR AUTOMATICALLY DRAWING MAPS AND PLANS FROM TWO TERRESTIAL OR AERIAL PHOTOGRAPHS  
Filed April 16, 1923   6 Sheets-Sheet 5

1,676,708

July 10, 1928.

G. J. POIVILLIERS 1,676,708

APPARATUS FOR AUTOMATICALLY DRAWING MAPS AND PLANS FROM
TWO TERRESTIAL OR AERIAL PHOTOGRAPHS

Filed April 16, 1923  6 Sheets-Sheet 6

Patented July 10, 1928.

1,676,708

UNITED STATES PATENT OFFICE.

GEORGES JEAN POIVILLIERS, OF PARIS, FRANCE.

APPARATUS FOR AUTOMATICALLY DRAWING MAPS AND PLANS FROM TWO TERRESTRIAL OR AERIAL PHOTOGRAPHS.

Application filed April 16, 1923, Serial No. 632,417, and in France April 25, 1922.

This invention has for its object to provide an improved apparatus for drawing automatically all the elements of a map (land surveys, levelling, and contour lines) and for determining the co-ordinates of any given point both by direct linear measurements and trigonometric measurements by the use of two separate photographs of the ground taken from any points of view in any directions.

In this improved apparatus the photographs are placed in chambers similar to the photographic cameras which were used for taking said photographs, and they are observed through the same objectives by which they were taken or through identical objectives by means of a binocular telescope giving a stereoscopic view. Apparatus utilizing this general principle of observation is known.

The present invention differs from the known types in the means provided for the mechanical reproduction of the movements controlling the sighting, and for the marking of a point and by the telescope that is used.

According to a first embodiment of this invention the observation chambers are capable of being tilted around a horizontal axis for placing the apparatus in position, and being swung around a vertical axis for the observation, which latter is effected in a fixed vertical plane.

In a second embodiment of this invention observation is made in a fixed horizontal plane by tilting the chambers.

In a third embodiment of this invention the chambers are placed in a relative position similar to the relative position occupied by the photographic cameras at the time of taking the photographs, and they remain stationary during the observation.

In a fourth embodiment of this invention the chambers remain likewise stationary during the observation, and their relative position may be different from the relative position occupied in space by the photographic cameras at the time of taking the photographs.

The present invention has the following special advantages:—

(a) The same apparatus allows of producing a continuous drawing of all the elements of the map (land surveying, levelling, contour lines with amplification of the dimensions) irrespectively of the inclination of the axis of the photographic camera to the vertical (terrestrial photographs, oblique photographs, vertical photographs).

(b) The adjustments for height may be transmitted directly to the movable sighting devices thereby attaining a mechanical precision which is greater than that of the devices for transmitting the other movements. This fact is of importance in drawing levelling plans where the tolerances required for the heights are closer together than for the other co-ordinates.

(c) The sighting errors due to the imperfections in the construction of the correcting device of the telescope are reduced to a minimum owing to the fact that the pointer serving to represent the optical axis is situated in front of this device relative to the path of the rays of light.

Fig. 1 is a diagrammatic view in perspective illustrating optical principles involved in this invention;

Fig. 2 is a top plan view of the apparatus with certain parts removed for purposes of clearer illustration;

Fig. 3 is a diagrammatic view illustrating the principles involved in transferring an angle $i$ nearer to the vertical;

Fig. 10 is a top plan view of mechanism for actuating the telescope in accordance with a formula hereinafter referred to;

Figure 1 illustrates the most general case of taking the photographs. In this figure and in the explanations relating thereto:

Figure 4:
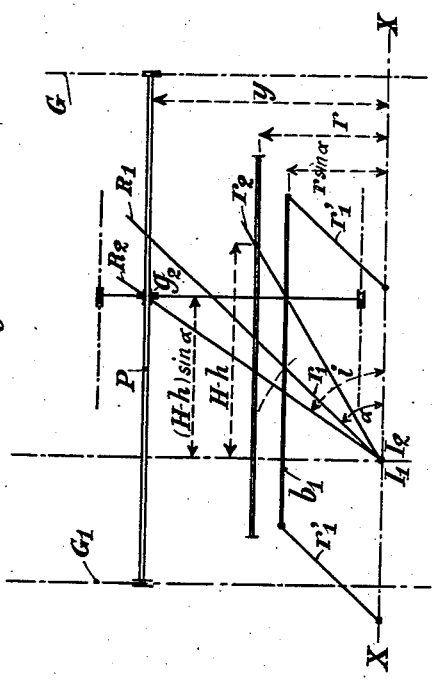
Fig. 4 is a diagrammatic detail view illustrating manner of determining the angle $i$.

S—S' designate the points of view; H is the height of the points of view relative to a horizontal plane of comparison. M is any given point in space. $m$ is its vertical projection upon the plane of comparison, and $h$ is the height of the point M above the said plane. B is the horizontal distance between the two points of view S, S' taken parallel to an arbitrary direction X—X. $dy$ is the horizontal distance apart, of the points S, S', measured on a line at right angles to the said direction.

$y\ y'$ are the distances of the point $m$ from parallel lines drawn through $s$ and $s'$, the said lines being designated by the letters X—X and X'—X' respectively. $x\ x'$ designate the distances of the points $s\ s'$ from the projection of the point $m$ upon the lines X—X and X'—X' respectively. $\alpha\ \alpha'$ are the angles enclosed by $s\ m$, with X—X and $s'\ m$ with X'—X'. $i\ i'$ are the angles enclosed by S M and S' M with the vertical. $\theta, \theta'$ are the angles designating the inclinations, to the vertical, of planes parallel to X X, drawn through the points S—M and S'—M respectively. $\beta\ \beta'$ are the angles formed by S M S' M with the direction X X.

Between these various quantities there exist the following fundamental relations:—

$$x + x' = B;\ \tan\alpha = \frac{y}{x};\ \tan\theta = \frac{y}{H-h};$$

$$y - y' = dy;\ \tan\beta = \frac{y}{x\sin\theta};\ \tan i = \frac{y}{(H-h)\sin\alpha};$$

$$H - h = dh;\ \cot\beta = \cot\alpha\sin\theta;\ \cot i = \cot\theta\sin\alpha$$

Referring then to Fig. 2 of the drawings, the letter A designates one of a pair of chambers, in which the photographs to be observed are placed, and upon which are mounted the objectives O with which the photographs were taken or objectives identical therewith. These chambers are each movable around a vertical axis $I_1$ and each can receive a suitable inclination around a horizontal axis $e$—$e$. They are fixed directly upon the two straight guides $R_1$ which carry them in their rotational motion around $I_1$. They may receive any suitable directional position in relation to the said straight guides in such a manner that in rotating, any point of the photograph shall move past in a stationary vertical plane in which the telescope is sighted.

The movement of the straight guides is assured by means of a double traverse, namely a traverse at right angles to the line $I_1\ I_1$ of the axes of rotation, and a traverse parallel to this line.

The axes of rotation $I_1$ of the chambers are fixed. The straight guides $R_1$ bear at $g_1$ upon a roller carried by a carriage $C_1$ adapted to travel along a bridge P parallel to the line $I_1\ I_1$. There are two bridges P and two carriages $C_1$ each imparting rotation to one of the chambers. The two bridges P are parallel to the line $I_1\ I_1$ and are carried by one and the same carriage C on which they can be shifted in relation to each other by an amount $dy$ in depth.

Each of these bridges bears at its free end upon a slideway G' at right angles to $I_1\ I_1$. The carriage C rolls on a central slideway G. Its movement is effected by means of a hand-wheel M and a screw V. The movement of the carriage C causes the two bridges P to move simultaneously in depth by equal amounts.

The two carriages $C_1$ which carry the supporting rollers $g_1$ of the straight guides $R_1$ are connected together by a rigid rod $t_1$ of adjustable length (not shown in Figure 2). The assembly of the carriages $C_1$ and the rigid rod $t_1$ is entirely similar to the assembly of the carriages $C_2$ and the rod $t_2$ hereinafter referred to.

The movement of the two carriages is effected by means of a hand-wheel $M_1$, a groove shaft $a_1$ and a screw $V_1$ carried by one of the bridges P (not shown in Figure 2).

It will be readily perceived that the sum of the distances of each of the rollers $g_1$ from the straight line passing through the corresponding centre $I_1$ at right angles to the line $I_1\ I_1$ will remain constant whatever may be the position of the bridge P and the carriage $C_1$.

If care has been taken to make this sum equal to B (Fig. 1), by acting upon the length of the rod $t_1$ and moving the bridges P in depth through the distance $dy$, then the angle enclosed by each straight guide $R_1$ with the line of the centres $I_1\ I_1$ is always equal to the angle $\alpha$ enclosed by the line $s\ m$ with the axis X X.

A drawing stylus $m$, fixed to one of the carriages, records on a board U the movements of the rollers $g_1$.

The observing telescope is horizontal and parallel to the line of the centres $I_1\ I_1$. It consists of a fixed central tube L and two movable portions $l$ bent off at right angles carrying the objective system. The movable portions $l$ are capable of turning independently of each other around the horizontal axis of the fixed portion L. These two movable portions are sighted in a fixed vertical plane at right angles to the axis of the telescope, and the sighting line meets this axis. The horizontal axis of rotation of the telescope meets the vertical axis of rotation of the chambers A approximately at the forward nodal point of the objective O of the chambers A.

Since the telescope sights in a fixed vertical plane, the angle of inclination of the sighting line with the vertical, that is to say, the angle of inclination of the movable portion $l$, must be equal to the angle $i$ of Figure 1 if the chambers are inclined to the vertical to the same extent as were the photographic cameras at the time of taking the photographs.

The angle $i$ is obtained and transmitted to the telescope by reproducing mechanically the following relation: $\cot i = \cot \theta \sin \alpha$.

For this purpose the angle $\theta$ is first reproduced in the same manner as the angle $\alpha$. On the bridges P there is mounted a second system of carriages $C_2$ connected together by a rigid rod $t_2$ of variable length. Each carriage $C_2$ carries a roller $g_2$ which causes the rotation of a straight guide $R_2$ around a fixed axis $I_2$ situated on the line $I_1 I_1$. If the distance of the roller $g_2$ from the perpendicular to the line $I_1 I_1$ drawn through $I_2$ is equal to $(H-h)$, it will be seen that the angle enclosed by the straight guide $R_2$ with the line $I_1 I_1$ is the angle $\theta$ defined by the relation $$\tan \theta = \frac{y}{H-h}.$$

where $y$ is the distance of the roller from $I_1 I_1$.

If the length of the rod $t_2$ is such that the angles marked by the two straight guides are equal to the angles $\theta$ of space for a given position, they will likewise be equal for all other positions corresponding to the various movements of the bridge and the group of carriages $C_2$. The motion of the carriages $C_2$ is produced by means of a foot-wheel $M_2$, a grooved shaft $a_2$ and a screw $V_2$ carried by the bridge P.

On each of these straight guides $R_2$ there is fixed at 90° thereto a straight guide $r_2$ which moves a roller $g_3$ upon which it rests. Each of the straight edges $R_1$ actuates a jointed parallelogram composed of two equal cranks $r_1 r'_1$ and a link $b_1$. The crank $r_1$ is fixed to the straight guide $R_1$ and is rigidly attached at 90° to the latter. The link $b_1$ is at right angles to the line of the centres $I_1 I_1$, $I_2 I_2$.

The roller $g_3$ slides along the link $b_1$. Its connection is such that it is always situated at a distance $r \sin \alpha$ from the line at right angles to $I_1 I_1$ drawn through the point $I_2$ ($r$ being the common length of the cranks $r_1 r'_1$).

Since $g_3$ bears upon $r_2$ as above stated, its distance from the line $I_1 I_1$ is equal to $r \sin \alpha \cot \theta$. It is carried by a carriage $C_3$ which rolls on a straight guide $r_3$ parallel to $I_1 I_1$. $r_3$ is carried by a slideway $G_3$ at right angles to $I_1 I_1$ and upon which it is able to move in depth by the action of the straight guide $r_2$ upon the roller $g_3$.

$r_3$ carries a roller $g_4$ at one end; this roller is mounted on a horizontal axis parallel to $I_1 I_1$ and this axis meets the axis of the roller $g_3$. The distance of the roller $g_4$ from the vertical plane passing through $I_1 I_1$ is therefore at all times equal to $r \sin \alpha \cot \theta$.

A straight edge $r_4$ fixed at 90° upon the movable portion of the telescope bears permanently upon this roller $g_4$.

The axis of the telescope is at a distance $r$ from the horizontal plane swept by the roller $g_4$. The angle of the straight guide $r_4$ with its horizontal plane is therefore the angle $i$ so that $$\cot i = \cot \theta \sin \alpha$$

This is likewise the angle which is enclosed by the bent-off portion $l$ of the telescope with the vertical.

The above described mechanism for transferring the inclination of the telescope is applicable only to angles $i$ greater than 30°. For angles nearer the vertical the angle $i$ may be reproduced in the same manner according to the formula $$\tan i = \frac{\tan \theta}{\sin \alpha} \quad \text{(Fig. 3)}.$$

It will be sufficient to provide an auxiliary straight guide $r_2$ movable along the axis $I_2$ of the straight guide $R_2$.

The straight guide $R_2$ bears on a roller $g'_2$ which moves on a slideway $G_3$ at right angles to X X at a distance $r$ from $I_2$ and which gives at each instant the length $r \tan \theta$ on this slideway. This length is transferred to the link $b_1$ by means of a slideway $r_3$ and a double-connection carriage; the straight guide $r_2$ bears upon the roller which reproduces the meeting of the link $b_1$ and the slidway $r_3$ and transfers the length $r \tan i = \frac{r \tan \theta}{\sin \alpha}$ to the slideway $G_3$ which is at right angles to X X.

The angle $i$ is transferred to the telescope in a vertical plane by a mechanism similar to the foregoing transferring mechanism.

The angle $i$ might likewise be determined in the following manner (Fig. 4).

$(H-h)$ is marked on a fixed slideway parallel to, and at any given distance $r$ from X X. It is reduced in the proportion of $(H-h) \sin \alpha$ by means of a jointed parallelogram similar to the one above described but mounted directly on the straight guide $R_1$ and whose link $b_1$ is parallel to X X. This length is transferred to the bridge P by an auxiliary slideway at right angles to X X and capable of moving parallel to itself.

$R_2$ bears then upon the roller $g_2$ which reproduces the meeting point of the slideway and bridge P; it gives the angle $i$ such that $$\tan i = \frac{y}{(H-h) \sin \alpha}.$$ This angle is transferred into the vertical plane by any suitable known mechanism.

Figure 5:
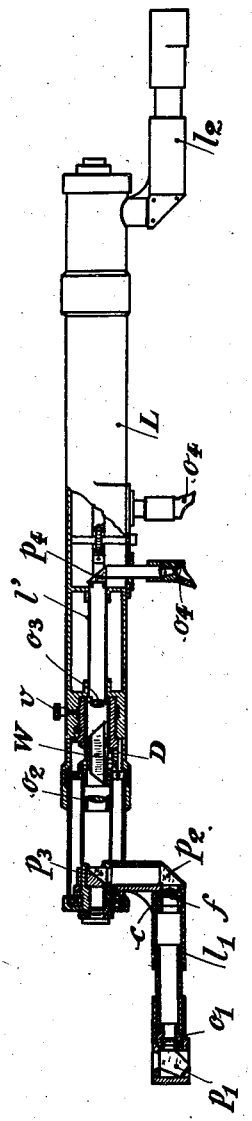
Fig. 5 is a top plan view partly in section of the binocular telescope.

The telescope (Fig. 5) is composed of a fixed portion L and two movable portions $l$ carrying the objective system. The movable portion $l$ comprises an optical square $p_1$, an objective $o_1$ and a pointer $f$ (such as a hair line) situated in the focal plane of $O_1$.

The sighting line reconstituted by $o_1 f$ is parallel to the axis of rotation; the optical square $p_1$ turns this sighting axis around at right angles to the axis of the telescope.

A system of parallel mirrors $p_2 p_3$ reflects the luminous rays along the axis of the fixed portion of the telescope. These rays are received at $o_2$ by a lens which forms with $o_1$ a non-focal system. They meet at W a correcting prism the rotation of which is produced by the differential mechanism D. The image is observed by means of a telescope $l'$ (bent off at $p_4$) having an objective $o_3$ and an eyepiece $o_4$. The telescope is composed of two portions similar to the one above described. The distance between the eyepieces is produced by sliding the telescopes $l'$ along the axis.

A screw $v$ producing the rotation of the fixed ring of the differential, assures a suitable directional position of W. This mechanism is designed to allow of examining photographs having any directional air position relatively to the vertical axis of rotation of the chambers. In particular it is required for drawing contour lines according to the method hereinafter described.

The actuation of the chambers A and of the movable portions $l$ of the telescope may be reversed, that is to say, the angle $\theta$ may be marked on the straight guide $R_1$, and the angle $\alpha$ on the straight guide $R_2$. The chambers rotate through the angle $\theta$, and the movable portion of the telescope rotates through the angle $\beta$ which is defined by the following equation:—

$$\cot \beta = \cot \alpha \sin \theta$$

This angle is the angle formed by the radius S M with the line parallel to X X drawn through the sighting points $s$. In order to observe under these conditions it is sufficient to turn the photographs through 90° in their plane. This construction is important for drawing levelling plans, because since the transference of the heights being done directly allows of attaining greater accuracy which is in agreement with the tolerances prescribed in this case since these tolerances are much closer together as regards the heights than as regards the horizontal co-ordinates.

The chambers A may be arranged in front of or behind the axis $I_1 I_1$, and they can be inclined upwardly or downwardly in relation to the axis $I_1$.

This arrangement allows of inspecting positive and negative photographs.

For drawing survey maps the operator acts upon the handweels M M, $M_2$ in such a manner as to bring the movable pointer of the telescope at rest in contact with the stereoscopic image of any given curve of the ground. Automatically the stylus $m$ will draw the projection of this curve upon the board U.

For contour curves it will be sufficient to fix the carriages $C_2$ or $C_1$ on the bridges P at a suitable distance from the foot of a perpendicular drawn from the centres $I_2$ or $I_1$ on to these bridges, and to move the pointer of the telescope, while retaining permanent contact with the ground by acting upon the two handwheels M and $M_1$ in the case where the heights have been transferred to the carriages $C_2$, or by acting upon the handwheels $M_1 M_2$ in the case where the control of the heights is effected by rotating the chambers A. For drawing gradients, the plane of comparison is changed by taking the plane of the gradient as the horizontal plane, the gradients are drawn in the same manner as the contour curves in the preceding case. The new heights are the respective distances between two points of sight in the plane of the gradient. Since the directional position of the chambers is altered, the stereoscopic effect will be restored by operating the screw $v$ of the telescope differential.

In cases where it is desired to enlarge the dimensions, the selection of the direction of the axis X X is no longer arbitrary, and will be a horizontal line of the first system parallel to the plane of the gradient. The angular difference $d y$ of the bridges P must then indicate the difference of the dimension $d h$ between the two points of view in the normal system. The enlargement will be effected parallelly to the line of the centres by means of any suitable known mechanism of the lever or toothed wheel type.

For utilizing positive or negative photographs there must be given to the chambers an inclination in the proper direction upwards or downwards, taking into consideration that the points must pass successively in the desired order in the vertical plane of observation; an inversion of this fixing would lead to a symmetrical drawing of the desired plan. In order to allow of greatest possible general application, the chambers A may be capable of being tilted in forwardly or rearwardly of the telescope axis; and likewise the direction of the graduation of the heights on the bridge P may be reversed at will.

For the purpose of utilizing photographs having a vertical axis the chambers must be tilted in such a manner as to enable the heights to be marked by means of the handwheel M. The co-ordinates of the sighted point can be read directly off the bridge P.

Figure 6:
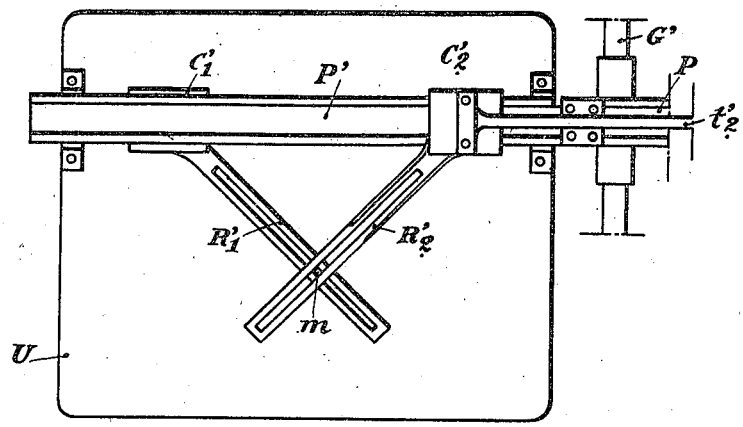
Fig. 6 is a top plan detail showing one form of stylus actuating means.

The marking may be effected in the following manner:

On the bridge P there is fixed an auxiliary device P' (Fig. 6) carrying the board U which follows the motion of the bridge in its vertical movements. This auxiliary bridge P' carries two carriages C'₁ C'₂ connected to the carriages C₁ and C₂, and sharing the lateral movements of the latter. On each carriage C'₁ C'₂ there is fixed a straight guide R'₁, R'₂. These two straight guides are inclined at 45° in opposite directions on the bridge. The drawing point $m$ is situated at the meeting point of these two straight guides. It will be readily perceived that it will draw the map to the scale reduced in the ratio of $\frac{\sqrt{2}}{2}$, leaving the two straight guides R' at right angles to each other. But by inclining them differently to the bridge, the map may be drawn with an enlargement of one of the coordinates. This device may be employed for drawing gradients.

Figure 7:
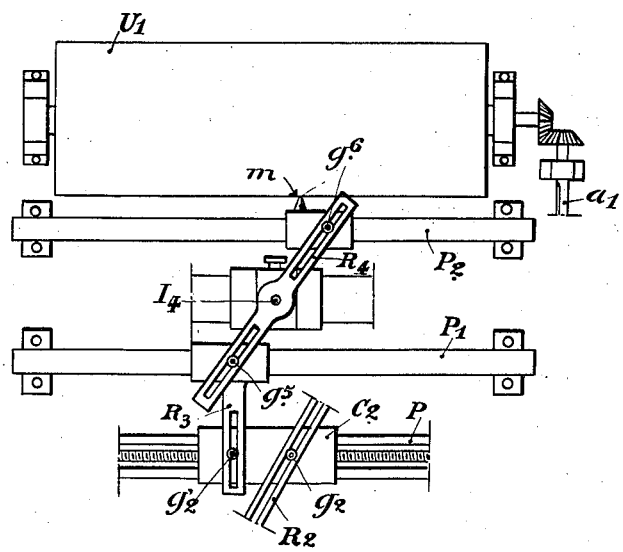
Fig. 7 illustrates in top plan, a recording cylinder and associated recording means.

The drawing may likewise be made on a recording cylinder (Fig. 7). For this purpose one of the hand-wheels M or M₁ imparts to a cylinder U₁ (the horizontal axis of which is parallel to the line of the centres I₁ I₁) a rotational motion through the medium of any suitable known mechanism. The other hand-wheel produces the motion of a drawing stylus $m$ parallel to the generatrices of the cylinder. This drive may be effected by means of a mechanism composed of toothed wheels and screws or by means of a mechanism composed of levers, such as the construction shown by way of example in Figure 7.

The carriage C₂ carried by the bridge P controls the lateral movement of a straight guide R₃ carried by a slideway P₁ parallel to I₁ I₁. This straight guide carries an antifriction roller $g_5$ which causes a straight guide R₄ to rock on a centre I₄. This straight guide causes the drawing point $m$ to move along its slideway P₂ through the medium of an antifriction roller $g_6$. The center I₄ is adjustable vertically and laterally so as to allow of changing the scale. In the case of drawing on a board, the drawing stylus $m$ may be removed and replaced by a pantograph which draws directly on a reduced or on an enlarged scale.

In a second form of construction of the improved apparatus the chambers are caused, for observation purposes, to tilt around a fixed horizontal axis. The telescope is then bent in such a manner that each movable portion $l$ will rock around a vertical axis. The chambers may assume a suitable inclination on their tilting axis; this axis may be parallel to the axis of the telescope, or it may be at right angles or oblique thereto. The angle transmitted to the chamber is one of the angles $\alpha$ or $\theta$. The angle transmitted to the telescope is the angle $i$ or the angle $\beta$. The angle of the chamber is transmitted by means of a lever mechanism which transfers the motion into a vertical plane in the same manner as the transferring mechanism for the telescope in the preceding construction.

Figure 8:
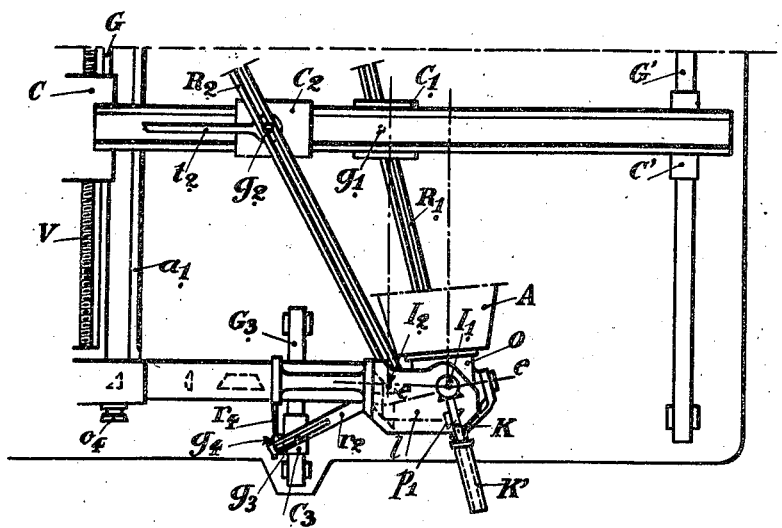
Fig. 8 is a top plan view showing a portion of another embodiment of the invention.
Figure 9:
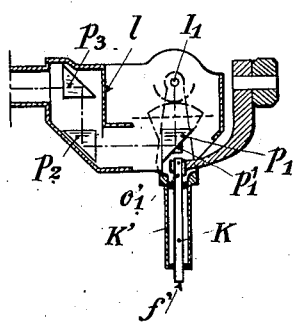
Fig. 9 is a horizontal section through the end of the telescope shown in Fig. 8.

A third form of the improved apparatus is shown in Figures 8 and 9 wherein the observation chambers are stationary, and fixed in a position similar to the position had by the photographic cameras at the time of taking the photographs.

The observation chambers A are movable so as to enable them to be positioned around two axes at right angles to each other passing through the nodal point in front of the objective. They remain fixed during the observation.

The telescope is horizontal and composed of a fixed central portion L and two movable portions. The fixed portion is identical to that of the telescope hereinbefore described. The movable portion always controls the rotation of the corrector W, but the lenses $o_1$ $o_2$ are dispensed with. The mirrors $p_2$ $p_3$ remain.

The prism $p_1$ is movable around an axis at right angles to the plane of the movable portion $l$ (the plane of the drawing). It carries on its hypothenuse facet a small auxiliary prism $p'_1$ designed to reflect along the horizontal axis of the bent portion, the rays of light coming from a collimator K composed of an objective $o'_1$ and an illuminated pointer $f'$ situated in the focal plane of $o'_1$.

The two reflecting facets of the prisms $p_1$ and $p'_1$ are arranged at 90° to each other. By this means the rays of light parallel to the axis of the collimator, issuing from the objective $o$ of the chamber, are reflected irrespectively of the incidence, in the same direction as those coming from the point of the pointer $f$ and emerging from the collimator. The rotation of the combination $p_1$ $p'_1$ around the axis at right angles to the plane of the bent portion $l$, is assured by the collimator in the following manner:—The collimator is capable of rocking around a vertical axis I₁ and of tilting round a horizontal axis after the fashion of an ordinary theodolite. The two axes of rotation intersect each other in the axis of the telescope approximately in the nodal point in front of the objective $o$ of the chamber.

On the movable portion of the telescope there is mounted a part K' which is adapted to rock around an axis at right angles to the plane of said movable portion. This axis meets the axis of the telescope at the meeting point with the collimator axes. The part K' carries the system $p_1$ $p'_1$ which can rock on an axis at right angles to the plane of the movable portion $l$. The rocking motion of $p_1$ $p'_1$ is assured by any suitable known lever or toothed wheel mechanism so that the extent of this rocking shall be half as small as the rotation of the said part and in the opposite direction.

The part K carries a tube which envelops the collimator. This tube and the collimator have a common geometrical axis and are able to assume a relative rotational motion around said axis. The collimator can turn through an angle $\alpha$ around its vertical axis; for this purpose its support is fixed on the straight guide $R_1$. Since the straight guide $R_1$ is fixed, the optical axis of the collimator is able to sweep through a vertical plane enclosing the angle $\alpha$ with the line $I_1 I_1$, that is to say, with the axis X X as hereinbefore stated.

The movable portion of the telescope can turn through the angle $\theta$. The axis of the part K is thus able to sweep through the plane passing through the axis of the telescope and inclined at the angle $\theta$ to the vertical. Now this axis coincides with the collimator axis. The collimator axis, that is to say, the direction of the rays of light, corresponding to the sighted point is thus determined by the intersection of two planes namely a vertical plane enclosing an angle $\alpha$ with the line X X (Fig. 1), and another plane parallel to X X passing through the view point and enclosing an angle $\theta$ with the vertical.

For assuring the rotation of the movable portion $l$ of the telescope, the angle $\theta$ is transferred in the following manner:—

The straight guide $R_2$ which reproduces $\theta$ as hereinbefore described carries a straight guide $r_2$ fixed at 90°. The straight guide $r_2$ produces by means of an antifriction roller $g_3$ the displacement in depth of a carriage $c_3$ sliding on a horizontal slideway $G_3$ at right angles to $I_1 I_1$. This carriage $C_3$ carries an antifriction roller $g_4$ having a horizontal axis. On $g_4$ there rests a straight guide $r_4$ fixed at 90° on the movable portion $l$ of the telescope. The distance of the telescope axis from the horizontal plane swept by the axis of the roller $g_4$ is equal to the distance of the centre $I_1$ from the vertical plane swept by the axis of a roller $g_3$. The remainder of the mechanism is similar to that hereinbefore described. The operation of the apparatus is the same.

The telescope that is used need not be bent in its movable portion $l$. The two prisms $p_2 \ p_3$ are dispensed with. The rotation of the part is effected then around the axis of the prism system $p_1 \ p'_1$ which is driven by a differential or other mechanism of known type. The common centre of rotation is then brought in front of the objective O and is no longer situated near the nodal point. From this there result errors of sighting which may be negligible in certain cases.

The above described apparatus has the drawback of being difficult of application in the case where the photographs are inclined at large angles to the tilting axis of the telescope; this is due to the rotation of the entry prisms $p_1 \ p'_1$.

In order to avoid that drawback the amplitude of the rotation of these prisms $p_1 \ p'_1$ may be restrained by a suitable angular displacement of the rotation of the chambers around their vertical axes. In particular they need only receive a tilting motion around the horizontal axis of the telescope; then their optical axis will remain in a fixed vertical plane.

For observation purposes, (1) the collimator K must be suitably fixed relatively to the driving straight guide $R_1$.

(2) The movable portion of the telescope must be set at a suitable angle $\gamma$.

The fixing of the collimator is easy because the rotational motion of the straight guide $R_1$ is transmitted integrally to it.

In order to obtain the tipping angle $\gamma$ of the telescope it is to be noted that this angle is given by the trigonometrical relation $$\tan \gamma = \frac{sm \cos e}{H - h}$$

where $sm$ is the horizontal distance of the sighted point from the view point.

$H - h$ is the relative height of the sighted point. $e$ is the angle through which the collimator is rotated.

We have now $e = E - \alpha$ where E is the angle enclosed in space by the plane of the optical axis of the apparatus with the direction X X and $\alpha$ is the angle of the vertical sighting plane of the point considered with this straight line X X.

The angle $\gamma$ can be transmitted to the telescope by using any one of the following groups of equations:—

$$1 \begin{cases} \tan \gamma = \tan \theta \dfrac{\sin e}{\sin \alpha} \\ \cot \gamma = \cot \theta \dfrac{\sin \alpha}{\sin e} \end{cases}$$

$$2 \begin{cases} \tan \gamma = \dfrac{\tan \theta}{\tan E + \tan e} \times \dfrac{1}{\cos E} \\ \cot \gamma = \cot \theta \ (\tan E + \tan e) \cos E \end{cases}$$

$$3 \begin{cases} \tan \gamma = \dfrac{\tan \theta}{1 + \tan e \cot E} \cdot \dfrac{1}{\sin E} \\ \cot \gamma = \cot \theta \ (1 + \tan e \cot E) \sin E \end{cases}$$

$$4 \begin{cases} \tan \gamma = \tan \theta \ \dfrac{1}{\sin E + \cos E \tan e} \\ \cot \gamma = \cot \theta \ (\sin E + \cos E \tan e). \end{cases}$$

Figure 10:
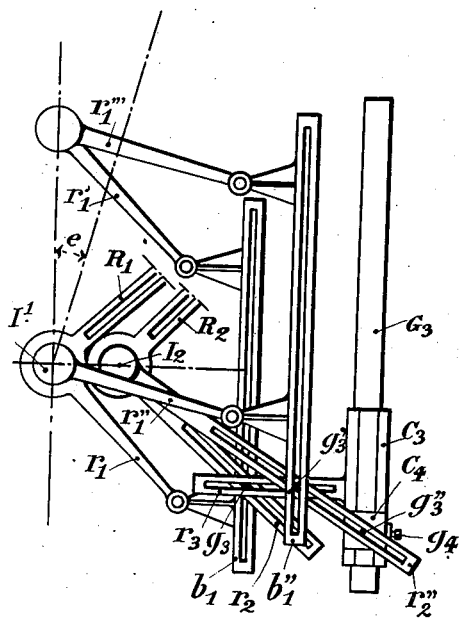

In Figure 10 is shown a plan of a mechanical manner of realizing the second one of the formulæ (1).

The straight guide $R_1$ controls the simultaneous rotation of two equal and concentric jointed parallelograms $r\ b_1\ r'_1,\ r''\ b''_1$ $r'''_1$, the first being fixed at 90° on $R_1$, and the second being fixed at an angle $\frac{\pi}{2}$—E.

The respective angles of the hand-wheels $r'_1, r''_1$ with the line of the centres $I_1\ I_1$ are then $\frac{\pi}{2}$—$\alpha$ and $e$.

The links $b_1\ b''_1$ move parallel to themselves through a quantity $r \sin \alpha\ r \cos e$.

On the link $b_1$ there slides an antifriction roller $g_3$ which moves under the action of a straight guide $r_2$ fixed at 90° on the straight guide $R_2$ which gives the angle $\theta$. This roller $g_3$ causes the translation movement of a straight edge $r_3$ parallel to $I_1\ I_1$. $r_3$ is carried by a carriage $C_3$ movable on a slideway $G_3$ at right angles to $I_1\ I_1$.

A second roller $g'_3$ connects $b''_1$ and $r_3$. It produces the rotation of a straight guide $r''_2$ mounted loose on the axle $I_2$. The angle enclosed by this straight guide with the direction $I_1\ I_1$ is the complement of the angle $\gamma$.

This angle is transferred into the vertical plane. For this purpose the straight guide $r''_2$ shifts the carriage $C_4$ movable on $C_3$ parallelly to $G_3$.

A roller $g_4$ with horizontal axis mounted on $c_4$ transfers the motion into the vertical plane by the process hereinbefore described.

For realizing the formulæ of the tangents, $r_2$ must be fixed parallel to $R_2$, and the connections of the links $b_1$ and $b''_1$ must be reversed.

Figure 11:
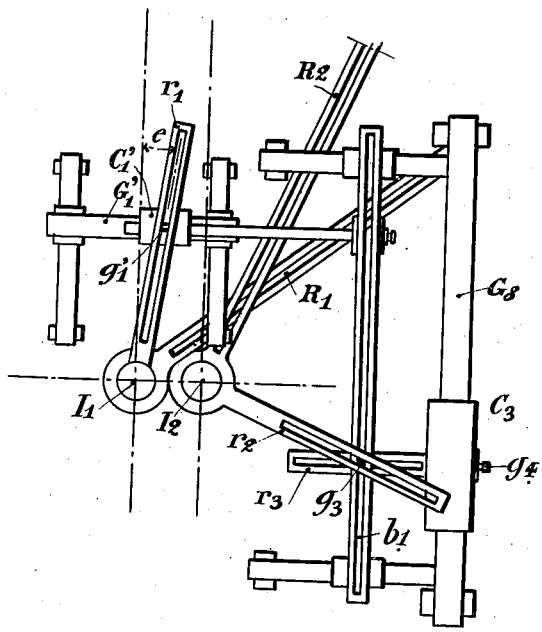
Fig. 11 is a top plan view showing another mechanism for operating the telescope.

In Figure 11 is shown a plan of an arrangement for the mechanical realization of the second formulæ (cotangents) of the groups 2, 3, 4. A straight guide $r_1$ may be fixed on the straight guide $R_1$, the angle between these two straight guides being (90°—E). The axis of the collimator is in the vertical plane of this straight guide. $r_1$ moves through the medium of a roller $g'_1$, a carriage $C'_1$ which is movable laterally on a slideway $G'_1$. This carriage $C'_1$ is connected to a slideway $b_1$ at right angles to $I_1\ I_1$ which moves laterally through the same amount.

A straight guide $r_2$ fixed at 90° on $R_2$, moves a roller $g_3$ which bears permanently upon $b_1$.

$g_3$ moves a straight guide $r_3$ carried by a carriage $C_3$ movable on a slideway $G_3$ parallel to $b_1$.

$C_3$ carries a roller $g_4$ with horizontal axis which serves to transfer the motion into a vertical plane.

The distance of the straight line described by the roller $g'_1$ from the axis $I_1$, is equal to $r$; or $r \cot E$; or $r \cos E$; according as it is desired to realize any one of the groups 2, 3, 4. The straight guide $b_1$ is then fixed at a distance from this roller equal to $r \tan E$; or $r$; or $r \sin E$.

On the other hand $g_4$ is adjustable as to height on the carriage $C_3$, and the distance of the plane swept by its axis from the axis of the telescope is equal to $r \cos E$; or $r \sin E$; or $r$; according to the case.

Figure 12:
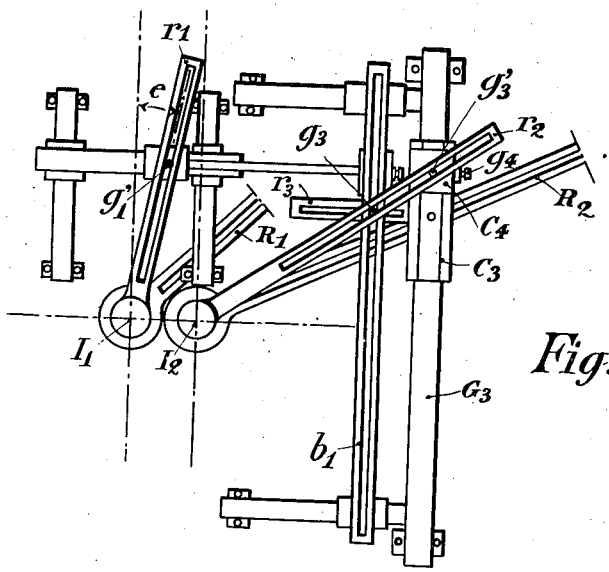
Fig. 12 is a top plan view showing a third mechanism for operating the telescope.

In the case where it is desired to realize the first ones of the formulæ of the groups 2, 3, 4 (tangents), the apparatus shown in Figure 12 may be employed.

The straight guide $R_2$ moves directly the carriage $C_3$. $r_2$ bears always upon $g_3$, but is loose on the axle $I_2$; it realizes the angle $\gamma$ which is transferred into the vertical plane by means of a known mechanism by moving the carriage $C'_4$ carrying the roller $g_4$.

The devices for the tangents are important in the cases where $\theta < 45°$; and the devices for the co-tangents when $\theta > 45°$, which is the most general case, if the auxiliary drawing device is employed allowing the chambers to be folded down as hereinbefore described.

As in the preceding case, the actuation for the heights may be transmitted directly to the collimator after suitable rotation of the pointer and the photographs, and after correction for binocular vision by means of the screw V of the telescope.

Having now particularly described and ascertained the nature of my said invention and in what manner the same is to be performed, I declare that what I claim is:—

1. In an apparatus of the character described, a pair of rotatable observation chambers, a periscopic binocular telescope having rotatable parts provided with sighting marks, and means for simultaneously actuating the observation chambers and said rotatable telescope parts whereby the steroscopic mark may be caused to follow the contours of the steroscopic photograph.

2. In an apparatus of the character described, a pair of pivoted chambers for holding the photographs, a binocular telescope provided with rotated parts, control mechanism for operating said pivoted chambers and telescope parts, and means interconnecting said mechanism with said chambers and telescope parts including a system of guides having fixed centers, and a plurality of levers constituting parts of jointed parallelograms and adapted to transfer angular differences due to variations in height directly to the photographs and telescope.

3. In an apparatus of the character described, a pair of pivoted chambers for holding the photographs, a binocular telescope having rotatable parts, control mechanism for actuating the chambers and means interconnecting said mechanism with said chambers and telescope parts, including a carriage and a pantographic system of guides and levers interconnecting said carriage and chambers, and a stylus on said carriage adapted to draw the map directly through the medium of the pantograph.

4. In an apparatus of the character described, a pair of pivoted chambers for holding the photographs, a binocular telescope having rotatable parts, control mechanism for actuating the chambers and movable telescope parts, means interconnecting said mechanism with said chambers and rotatable parts including a pantographic system of guides and levers, means operatively connected with said mechanism for drawing gradients, and a second drawing means operatively connected with said mechanism comprising a pair of crossed guides interconnected by a stylus.

5. In an apparatus of the character described, means for holding the photographs, a binocular telescope, means for moving the photograph holding means and parts of said telescope about axes at right angles comprising a rectilinearly movable bridge and a pantographic connecting system of guides, a map holder, stylus holding means, and means whereby said holding is operatively connected with said bridge and movable parallel to said map holder.

6. In an apparatus of the character described, holding devices for the photographs movable on a horizontal axis, a binocular telescope for viewing photos in said holding devices and having objective portions movable about a vertical axis and disposed adjacent the photograph-holding devices, a rectilinearly movable bridge, pantographic connecting means for moving said bridge, holding devices and movable objective portions, and a stylus connected with the bridge.

7. In an apparatus of the character described, a pair of photograph holders adapted to be set at the sighting angles, a binocular telescope for viewing photos in said holder having objectives independently movable around a common horizontal axis and prisms movable around axes at right angles to said horizontal axis, a collimator for moving said prisms, a system of concentric cardan joints for positioning the collimator, and means for moving said objectives and said collimator, the main axes of said joints being movable through the angles $\theta$ and $\alpha$ substantially as described.

8. In an apparatus of the character described, a pair of photographic holders each adapted to be arranged in any desired position, a binocular telescope for viewing photos in said holder having objectives independently movable around a common horizontal axis and prisms movable around axes at right angles to said horizontal axis, a collimator for moving said prisms, a system of cardan joints for positioning the same and including parts rotatable about an axis through the angle $\alpha$ or $\theta$ and parts rotatable about an axis through an angle related to the angle $\alpha$ or $\theta$ by a predetermined formula, and a plurality of levers and slides for moving said parts.

9. In a device of the character described, a pair of pivoted observation chambers, a binocular telescope associated therewith, corrector devices mounted in the telescope, a periscopic carriage at each end of said telescope, each of the carriages being independently movable about the axis of the telescope, there being a sighting mark carried by each carriage, and means for simultaneously moving the observation chambers and the periscopic carriages.

10. In a device of the character described, a pair of pivoted observation chambers, a binocular telescope associated therewith, periscopic carriages rotatable about the axis of the telescope in juxtaposition to the observation chambers, a bridge, a carriage slidable on the bridge, and means whereby the angle of inclination of the adjustable periscopic carriages may be transmitted directly to the movable carriage.

11. In a device of the character described, a pair of pivoted observation chambers, a binocular telescope associated therewith, periscopic carriages rotatable around the telescope in juxtaposition to the observation chambers, a bridge, a carriage slidably mounted on the bridge, and a plurality of rigid lever arms pivotally interconnected, constituting connecting means between the carriage and the periscopic carriages whereby the angles of inclination of the latter may be transmitted directly to the former.

12. In a device of the character described, a pair of observation chambers each movable about a vertical axis, a telescope associated therewith, the longitudinal axis of the telescope intersecting the vertical axes of the observation chambers, periscopic members mounted on each end of the telescope and adjustable around the axis thereof the free ends of which are in juxtaposition to the observation chambers, a bridge spaced from but parallel to the telescope, carriages slidably mounted on said bridge, and levers for operatively connecting the adjustable periscopic members with the slidable carriages whereby all motion of the former will be transmitted directly to the latter.

13. In a device of the character described, a pair of observation chambers each movable about a vertical axis, a telescope associated therewith, the longitudinal axis of the telescope intersecting the vertical axes of the observation chambers, periscopic sections mounted on each end of the telescope and adapted to be rotated relative to the observation chambers, a bridge parallel to but spaced from said telescope, carriages slidably mounted on the bridge, and a plurality of angled levers operatively connecting the periscopic sections of the telescope with said slidable carriages.

14. In a device of the character described, a pair of observation chambers each movable about a vertical axis, a telescope associated therewith, the longitudinal axis of the telescope intersecting the vertical axes of the observation chambers, periscopic sections mounted on each end of the telescope and adapted to be rotated relative to the observation chambers, a bridge parallel to but spaced from the said telescope, carriages slidably mounted on the bridge, and a pantographic system of levers for operatively connecting said carriages with the movable sections on the telescope.

15. In a device of the character described, a pair of observation chambers each movable about a vertical axis, a telescope associated therewith, the longitudinal axis of the telescope intersecting the vertical axes of the observation chambers, sections mounted on each end of the telescope and adapted to be rotated relative to the observation chambers, a bridge parallel to but spaced from the telescope, said bridge being transversely divided to form a pair of independent sections, carriages slidably mounted on each of the bridge sections, and a plurality of levers for operatively connecting the carriages with the respective movable sections of the telescope.

16. In a device of the character described, a pair of observation chambers each movable about a vertical axis, a telescope associated therewith, the longitudinal axis of the telescope intersecting the vertical axes of the observation chambers, a bridge spaced from but parallel to the telescope, said bridge being transversely divided to form a pair of independently and rectilinearly movable sections, carriages slidably mounted on each of the bridge sections, a stylus connected to said carriages to trace the movements of the same, and a plurality of levers operatively connecting the movable carriages with the respective movable sections of the telescope whereby all adjustments of the latter relative to the observation chambers will be transmitted directly to the movable carriages.

17. In apparatus of the character described, a pair of observation chambers rotatable about a fixed axis, a periscopic binocular telescope having sighting marks rotatable about an axis at right angles to said first named axis, and means for simultaneously actuating said observation chambers and said movable telescope parts whereby the stereoscopic mark may be caused to follow the contours of the stereoscopic photograph.

18. In apparatus of the character described, a pair of observation chambers rotatable about an axis, a binocular telescope having parts rotatable about an axis at right angles to said first named axis, control mechanism for operating said movable chambers and telescope parts, and means interconnecting said mechanism, movable chambers and telescope parts including a system of guides having fixed centers and a plurality of levers constituting parts of jointed parallelograms and adapted to transfer angular differences due to variations in height directly to the photographs and telescope.

19. In apparatus of the character described, a pair of observation chambers rotatable about an axis, a binocular telescope having parts rotatable about an axis at right angles to said first named axis, control mechanism for operating said movable chambers and telescope parts, and means interconnecting said mechanism, movable chambers and telescope parts including a carriage and a pantographic system of guides and levers, and a stylus on said carriage adapted to draw the map directly through the medium of the photographs.

20. In apparatus of the character described, a pair of observation chambers rotatable about an axis, a binocular telescope having parts rotatable about an axis at right angles to said first named axis, control mechanism for operating said movable chambers and telescope parts, and means interconnecting said mechanism, movable chambers and telescope parts including a pantographic system of guides and levers, means operatively connected with said mechanism for drawing gradients, and a second drawing means operatively connected with said mechanism and including a pair of crossed guides interconnected by a stylus.

In testimony whereof I affix my signature.

GEORGES JEAN POIVILLIERS.